(12) United States Patent
Tzempetzis et al.

(10) Patent No.: US 11,801,859 B2
(45) Date of Patent: Oct. 31, 2023

(54) DRIVER ASSISTANCE SYSTEM

(71) Applicant: Valeo Schalter und Sensoren GmbH, Bietigheim-Bissingen (DE)

(72) Inventors: Dimitrios Tzempetzis, Bietigheim-Bissingen (DE); Markus Heimberger, Bietigheim-Bissingen (DE); Stefanie Prinzhausen, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 225 days.

(21) Appl. No.: 15/734,798

(22) PCT Filed: May 23, 2019

(86) PCT No.: PCT/EP2019/063334
§ 371 (c)(1),
(2) Date: Dec. 3, 2020

(87) PCT Pub. No.: WO2019/233777
PCT Pub. Date: Dec. 12, 2019

(65) Prior Publication Data
US 2021/0229695 A1    Jul. 29, 2021

(30) Foreign Application Priority Data

Jun. 5, 2018 (DE) .................. 102018113314.6

(51) Int. Cl.
*B60W 60/00* (2020.01)
*B60W 40/08* (2012.01)
*H04W 4/46* (2018.01)

(52) U.S. Cl.
CPC .......... *B60W 60/001* (2020.02); *B60W 40/08* (2013.01); *B60W 2520/10* (2013.01);
(Continued)

(58) Field of Classification Search
CPC ............... B60W 60/001; B60W 40/08; B60W 2556/65; B60W 2520/10; B60W 30/06;
(Continued)

(56) References Cited

U.S. PATENT DOCUMENTS 6,990,399 B2 * 1/2006 Hrazdera ............. A01B 79/005
                                                    701/50
8,290,665 B2 * 10/2012 Placke ............... B60K 31/0008
                                                   340/436
(Continued)

FOREIGN PATENT DOCUMENTS

DE          10331948 A1    2/2005
DE       102006032541 A1    1/2008
(Continued)

OTHER PUBLICATIONS

JP-2019020128-A_Machine Translation (Year: 2019).*
(Continued)

*Primary Examiner* — Jelani A Smith
*Assistant Examiner* — Alyssa Rorie
(74) *Attorney, Agent, or Firm* — Osha Bergman Watanabe & Burton LLP

(57) ABSTRACT

A method for operating a driver assistance system for a motor vehicle driven in an at least partially automated manner includes learning a trajectory in a learning mode for driving the vehicle in a first automated manner along the trajectory. Subsequently, the vehicle is driven in the first automated manner along the learnt trajectory in an operating mode following the learning mode. While the vehicle is being driven along the trajectory in the operating mode, at least one transition from a private area to a public area is detected. Additional data, including current traffic data related to driving the vehicle in the public area, is acquired and provided for the driver assistance system. The motor (Continued)

vehicle is driven along the learnt trajectory in a second automated manner in the public area using the additional data.

15 Claims, 6 Drawing Sheets

(52) U.S. Cl.
CPC ... *B60W 2554/404* (2020.02); *B60W 2556/65* (2020.02); *H04W 4/46* (2018.02)

(58) Field of Classification Search
CPC .............. B60W 2554/404; H04W 4/46; B62D 15/0285; G08G 1/168; G08G 1/162; G08G 1/165; G08G 1/166
See application file for complete search history.

(56) References Cited

U.S. PATENT DOCUMENTS

| | | | |
|---|---|---|---|
| 9,630,616 B2 * | 4/2017 | Reichel ............. | B60W 50/0098 |
| 2013/0035821 A1 * | 2/2013 | Bonne ............... | B60W 50/0097 |
| | | | 701/25 |
| 2018/0012496 A1 * | 1/2018 | Hasberg ............. | B60W 30/06 |
| 2018/0101998 A1 * | 4/2018 | Pierce ............... | B60L 3/0015 |
| 2019/0042859 A1 * | 2/2019 | Schubert ............. | G06V 10/82 |
| 2019/0118801 A1 * | 4/2019 | Noh ................... | B60W 30/06 |

FOREIGN PATENT DOCUMENTS

| | | | | |
|---|---|---|---|---|
| DE | 102008027692 A1 | | 12/2009 | |
| DE | 102013015349 A1 | | 4/2014 | |
| DE | 102016211179 A1 | * | 3/2017 | ......... B62D 15/0285 |
| DE | 102016121474 A1 | | 5/2018 | |
| EP | 2957474 A1 | * | 12/2015 | ............ B60W 10/04 |
| JP | 2019020128 A | * | 2/2019 | |
| JP | 2019178888 A | * | 10/2019 | |

OTHER PUBLICATIONS

JP-2019178888-A_Machine Translation (Year: 2019).*
International Search Report and Written Opinion in corresponding International Application No. PCT/EP2019/063334, dated Oct. 28, 2019 (10 pages).
German Search Report in corresponding German Application No. 10 2018 113 314.6, dated Nov. 20, 2018 (13 pages).

* cited by examiner

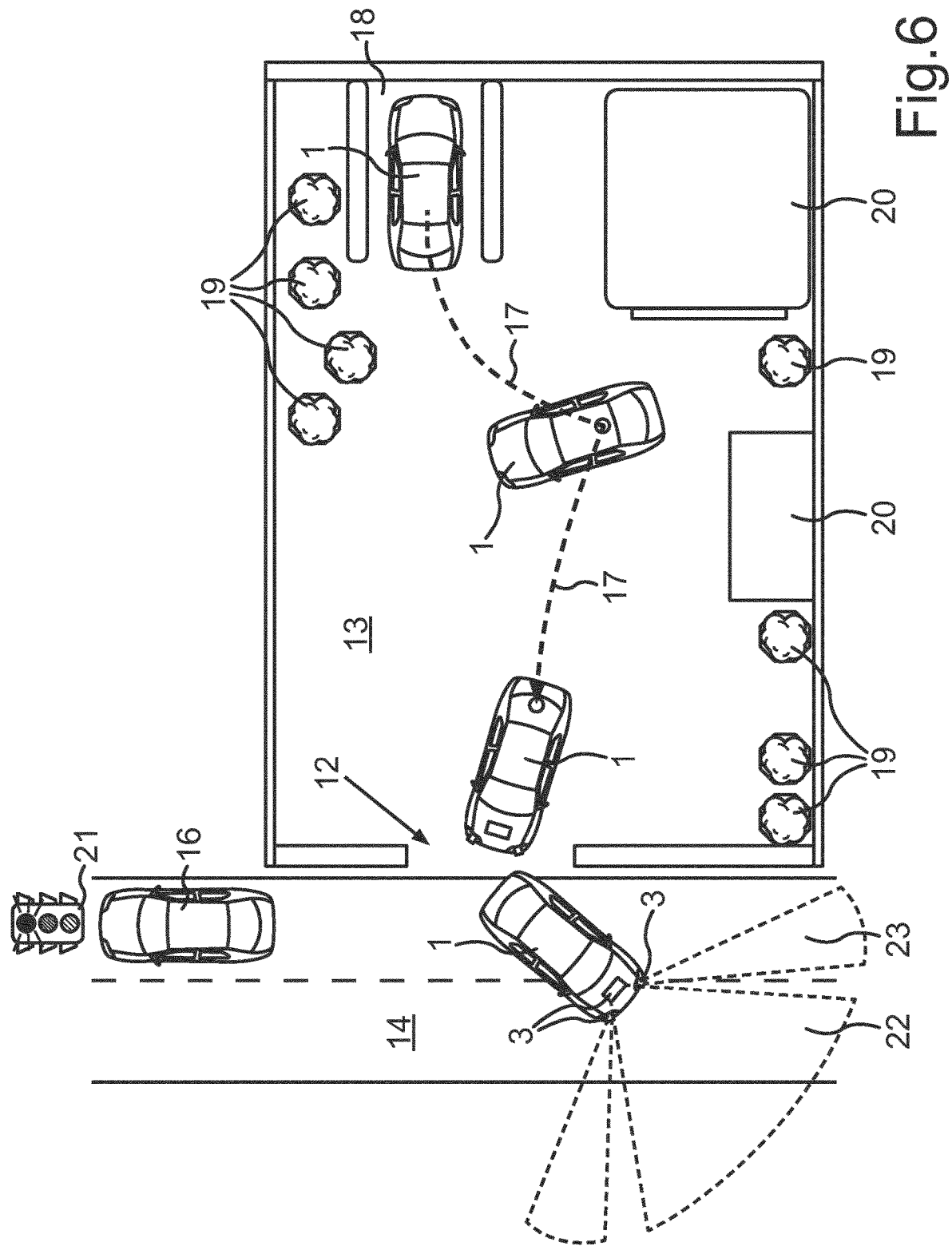

DRIVER ASSISTANCE SYSTEM

The invention relates to a method for operating a driver assistance system, in which a motor vehicle is driven in an at least partially automated fashion, comprising: learning a trajectory for driving the motor vehicle in an automated fashion along the trajectory in a learning mode, and driving the motor vehicle in an automated fashion along the learnt trajectory in an operating mode following the learning mode. The invention also relates to a driver assistance system for driving a motor vehicle in an at least partially automated fashion, and the driver assistance system is designed to learn a trajectory for driving the motor vehicle in an automated fashion along the trajectory in a learning mode, and to drive the motor vehicle in an automated fashion along the learnt trajectory in an operating mode following the learning mode. Furthermore, the invention relates to a computer program product and also to a computer-readable medium.

Driver assistance systems and methods for operating them are extensively known in the prior art, so that there is basically no need for separate documented evidence of such systems. A multiplicity of different driver assistance systems are known which serve, in particular, to assist the operation of a motor vehicle in that, for example, different functions for driving the motor vehicle can be performed in order to assist a driver of the motor vehicle in driving the motor vehicle and/or relieve said driver. In this context there may be provision that individual functions, in particular relating to the automated driving of the motor vehicle, can be performed autonomously or in an automated fashion by the driver assistance system. For example, the driver assistance system can comprise a parking assistance module, which serves not only to be able to find a parking space and to detect a corresponding trajectory for parking the motor vehicle, but is also capable of autonomously steering the motor vehicle along the detected trajectory into the parking space, that is to say of parking the motor vehicle. Moreover, there can be provision that the vehicle can also be manoeuvred out of the parking space again, that is to say removed from the parking space. Other driver assistance modules of the driver assistance systems can be, for example, a traffic jam assistant, a low-speed adaptive cruise control assistant, an assistant for adaptively controlling the speed while taking into account a respective safety distance which is to be maintained from a motor vehicle travelling ahead, or the like.

The driver assistance system (FAS), also referred to in English as an Advanced Driver Assistance System (ADAS), is an electronic device which is used in particular to assist the driver in a motor vehicle, for example in specific predefined driving situations or the like. The driver assistance system can take into account here, inter alia, safety aspects, if appropriate also increasing the driving comfort and improving economic viability. The driver assistance system can engage, for example, partially autonomously or else autonomously in the driving of the motor vehicle in that, for example, the motor vehicle is accelerated or braked, a parking assistant is activated or deactivated, a parking-steering assistant is used, signalling devices of the motor vehicle are activated, the driver of the vehicle is warned before or during critical situations by suitable human-machine interfaces, and/or the like. At present, driver assistance systems are frequently configured in such a way that the responsibility for the driving of the motor vehicle remains with the driver, so that under certain circumstances he can engage, in particular manually, in driving of the motor vehicle.

For the driver assistance system to be capable of providing the satisfactory functionality, it is necessary for the driver assistance system to have data relating to a current driving situation of the motor vehicle. For this purpose, the driver assistance system can access, inter alia, motor-vehicle-side sensors with which desired parameters relating to driving situation can be acquired, for example a direction of travel, a wheel speed, a yaw rate, a longitudinal acceleration, a transverse acceleration, a distance from an object located in the direction of travel and/or the like. In particular, data can be made available by surroundings sensor system of the motor vehicle, in order to ensure, assist and/or improve the operation of the driver assistance system. Moreover, the driver assistance system can, of course, also use further data, such as for example navigation data and the like, which can be provided, for example, by a motor-vehicle-side navigation system. Finally, there's also the possibility of additionally using positioning systems such as the Global Positioning System (GPS) in order to be able to determine the position of the motor vehicle and also its orientation.

The learning of the trajectory can be carried out in a learning mode of the driver assistance systems. For this purpose, the driver assistance systems can be transferred manually or else at least partially in an automated fashion into the learning mode, as a result of which a starting point of the trajectory can be defined. The driver of the motor vehicle can then drive the motor vehicle in a desired fashion until an endpoint of the trajectory to be learnt is reached, which endpoint can preferably also be predefined by the driver. The data is stored in relation to the trajectory during the learning mode can be made available in a later operating mode of the driver assistance system in which is provided that the driver assistance system drives the motor vehicle in an automated fashion. The trajectory therefore generally has a starting point and an endpoint.

In the operating mode, the driver assistance system will usually drive the motor vehicle in an automated fashion from the starting point of the learnt trajectory up to its endpoint. It proved problematic here that when the endpoint of the trajectory is reached the automatic driving of the motor vehicle is ended and the vehicle is, for example, stopped in an automated fashion. However, this is not always desired and can furthermore lead to dangerous states, in particular with respect to traffic travelling behind.

Furthermore, it proves problematic if the automated driving of the motor vehicle by the driver assistance system permitted only in a private area, and according to legal regulations such operation is not permissible, dangerous and/or the like in a public area. If the trajectory actually extends at least partially into the public area, this can be detected by the driver assistance system and automated stopping of the vehicle can be brought about. This may also result in undesired stopping or else dangerous states.

The invention is based on the object of improving the operation of the driver assistance system.

The solution proposed by the invention comprises a method, a driver assistance system, a computer program product and a computer-readable medium according to the independent claims.

Advantageous developments result from features of the dependent claims.

With respect to a method of the generic type, it is proposed in particular that the method additionally provides:

detecting at least one transition from a private area to a public area while the motor vehicle is being driven along the trajectory in the operating mode, acquiring additional data relating to the driving of the motor vehicle along the trajectory in the public area, wherein the additional data comprises at least current traffic data relating to the driving of the motor vehicle in the public area adjoining the private area, and providing the additional data for the driver assistance system.

With respect to a driver assistance system of the generic type, it is proposed in particular that the driver assistance system is designed:

to detect at least one transition from a private area to a public area while the motor vehicle is being driven along the trajectory in the operating mode, to acquire additional data relating to the driving of the motor vehicle along the trajectory in the public area, wherein the additional data comprises at least current traffic data relating to the driving of the motor vehicle in the public area adjoining the private area, and to use the additional data to drive the motor vehicle in the public area.

With respect to a computer program product it is in particular proposed that said computer program product has program code means which are stored, in particular, in a computer-readable medium, in order to carry out the method for operating the driver assistance system according to the invention when the computer program product is run on a computer unit of the electronic control unit.

With respect to a computer-readable medium, in particular in the form of a computer-readable diskette, a CD, a DVD, a memory card, a USB memory unit or the like, it is proposed in particular that program code means are stored in the medium, in order to carry out the method for operating a driver assistance system according to the invention when the program code means are loaded into a memory of an electronic control unit and run on a computer unit of the electronic control unit.

With respect to a motor vehicle it is proposed in particular that said motor vehicle has a driver assistance system according to the invention.

The invention is based on the concept that the additional data makes available information which makes it possible that either the driver assistance system can also continue automated driving of the motor vehicle according to the learnt trajectory or the driving of the motor vehicle can be transferred to the driver, specifically preferably in such a way that a virtually undisrupted continuation of the driving of the motor vehicle can be implemented. As a result, for example unnecessary stopping of the motor vehicle can be avoided. There is also the possibility of continuing the driving of the motor vehicle virtually without interruption.

In this context, the invention is also suitable in particular for the use in which at a transition from a private area to a public area the trajectory extends into the public area With the invention there is the possibility of implementing a seamless transition with respect to the driving of the motor vehicle from the motor vehicle which is guided in an automated fashion in the private area to a motor vehicle which is guided in an adapted fashion in the public area. It is therefore no longer necessary to stop the motor vehicle in good time before a transition from the private area into the public area, in order then to wait for further inputs or control commands, for example from the driver of the motor vehicle or the like. As a result, it is, in particular, also possible to increase the safety because road users travelling behind do not have to allow for unexpected stopping of the motor vehicle.

In order to be able to provide the additional data, signals from vehicle-side sensors, in particular surroundings sensors, can be evaluated. Furthermore, suitable data can also be provided by motor-vehicle-side control devices, for example a navigation system, a motor control system and/or the like. In addition there can be provision that motor-vehicle-external data is also taken into account, which data can, for example, be obtained from available databases via a, preferably wireless, communication link. In this context, these may be specialised databases which contain high-resolution geographic data. Finally, there is also the possibility of interrogating or obtaining corresponding data within the scope of communication between motor vehicles (C2C, V2V), for example in the manner of vehicle-to-vehicle communication. Finally, there is also the possibility of obtaining data from infrastructure facilities, in particular with respect to traffic routes, for example traffic lights, road signs and/or the like. This data can be used as additional data or can supplement said data and be provided for the driver assistance system. As a result, the driver assistance system can acquire corresponding data relating to the driving of the motor vehicle and make it available either to the driver of the motor vehicle or else to a module of the driver assistance system which can continue the driving of the motor vehicle.

The additional data can in particular also comprise traffic data. With the traffic data it is possible to at least partially detect a current traffic situation in order to assist the driving of the motor vehicle. In particular, the traffic data can comprise data relating to other road users, data relating to a route on which the motor vehicle is being driven and/or is to be driven, such as road signs, an edge of the route and/or the like. The traffic data relating to the public area is preferably acquired. Nevertheless, the traffic data can also be alternatively or additionally acquired for the private area. However, the traffic data can also comprise data of the navigation system of the motor vehicle, data of one or more motor-vehicle-external databases, in particular relating to a current traffic situation, data from at least one other motor-vehicle in a predefinable surrounding area and/or the like.

With the additional data it is also possible to provide information relating to the surrounding area, which information permits the motor vehicle to continue virtually without interruption. The sensing of the surrounding area can provide, for example, that road signs are detected, that carriageways or lanes are detected and that other road users and also their movement are detected.

The transition from the private area to the public area can be determined, for example, by means of driving assistance using a navigation system. For this purpose there can be provision that corresponding map data is made available by the navigation system. With a position detection unit it is then possible to detect the current precise position of the motor vehicle, which is then evaluated taking into account the map data, in order to be able to detect the position of the motor vehicle in relation to the private or public area. In particular it is possible to detect the location at which a provided trajectory for driving the motor vehicle encounters the transition from the private area to the public area. For this purpose, it is also possible to take into account a movement of the motor vehicle. In particular, the transition from the private area to the public area can also be stored during a training process. In this case, the detection could also comprise retrieving the stored transition.

The driver assistance system can preferably check whether the driving manoeuvre which is desired by the driver corresponds to data of a scene interpretation unit, and either executes the driving manoeuvre or communicates that a driving manoeuvre is not possible. Depending on the automation level of the driver assistance system, the following implementations can be provided. In the case of an SAE Level 2, the driver would have to always confirm the transition from the private area to the public area to the driver assistance system. In the case of an SAE Level 3, the driver assistance system would signal to the driver if a confidence level for the transition is not high enough. It would then be the driver's responsibility to confirm the transition from the private area to the public area if the driver assistance system requests this confirmation. In the case of an SAE Level 4, the driver assistance system decides itself if it can carry out the transition from the private area to the public area and behaves according to the decision. Consequently, the driver assistance system will decide about the confidence of the perception and the confidence of the interpretation of the scene.

Overall, the invention permits the motor vehicle to move from a private area into the public area with a high level of reliability and safety, or to transfer from a module of the driver assistance system for driving the motor vehicle in the private area to the driver of the vehicle or to a correspondingly suitable module for driving the motor vehicle in the public area.

The additional data is preferably provided for a driver assistant of the driver assistance system and/or a driver of the motor vehicle. As a result, transfer to the driver of the motor vehicle or to the corresponding driver assistant can be achieved while the motor vehicle is being driven. By virtue of a correctly timed transfer before the transition from the private area into the public area is reached, it is therefore possible to continue the driving of the motor vehicle virtually without interruption.

The additional data can preferably be acquired before the transition from the private area to the public area is reached. As a result, the additional data is available in good time before the transition from the private area to the public area is reached, so that the driver assistance system is able to provide and/or signal corresponding transfer data.

The provision of the additional data can also be dependent, inter alia, on a speed of the motor vehicle and a current distance of the motor vehicle from the transition. The additional data can be particularly advantageously updated, at least to a certain extent continuously. This is, for example, advantageous for sensing other road users, particularly other motor vehicles or else signal-controlled road signs or the like. As a result, the additional data can be kept permanently up to date, so that the driver assistance system or the driver is provided with current transfer data.

Furthermore, it is proposed that a distance of a current position of the motor vehicle from the transition from the private area to the public area is detected and compared with a predefined comparison value, and the acquisition of the additional data is started in an automated fashion when a distance is smaller than the comparison value. This makes it possible to ensure that the transfer of the driving of the motor vehicle is prepared as far as possible in good time depending on the comparison value being reached. This distance of the motor vehicle from the transition can be used for this purpose. The comparison value can be a permanently predefined value for the distance. However, the comparison value can also be a variable value, in that it depends, for example, on the speed of the motor vehicle. Of course, further dependencies can also be provided here, for example taking into account geographic data of the route which is predefined by the trajectory, and/or the like.

A speed of the motor vehicle is preferably set as a function of the distance. The distance of motor vehicle from the transition from the private area to the public area can be used to correspondingly adapt a speed. It can therefore be provided that as the distance decreases, the speed of the motor vehicle is also adapted, for example reduced, in order to make possible a safe transfer of the driving of the motor vehicle. In this context, the speed when the transition is reached does not need to be reduced to zero. Instead a suitable speed is that which permits the transfer of the driving of the motor vehicle to be made reliably possible at least until the transfer from the private area to the public area is reached.

According to one advantageous tournament it is proposed that the additional data be acquired and stored at least partially while the trajectory is being learnt. This makes it possible to access additional data which is relevant for the past and to additionally provide this data for the driver assistance system. As a result, it is possible, in conjunction with currently acquired additional data, to obtain more precise transfer data, which permits the sequencing of the method according to the invention to be improved further. Furthermore, through the detection of the additional data during the learning of the trajectory it is possible to detect which additional data is basically available and is to be updated when necessary. This makes it possible, for example, to obtain static additional data which does not change significantly during the satisfactory operation according to the invention, this comprising data such as, for example, geographic positions of objects such as landmarks, kerb stones, carriageways and/or the like. Furthermore, it is possible to acquire variable additional data, which is preferably updated in predefined time intervals, such as, for example, in relation to further road users and their movement and/or the like.

The additional data preferably comprises traffic objects in the public area. The traffic objects can be sensed, for example, at least in such good time before a transition from the private area to the public area that the driver assistance system is able to provide data for appropriate driving of the motor vehicle even beyond the transition from the private area to the public area. The traffic objects can be, in particular, other road users which, for example, are relevant for driving the motor vehicle while the transition from the private area to the public area is being reached. Traffic objects which are sensed can be not only other road users such as, for example, other motor vehicles, persons, cyclists and/or the like as well as, if appropriate, also their movements, but also structural facilities such as, for example, a kerb stone, a bollard, a road sign, combinations thereof or the like.

In particular, the additional data can comprise at least partially movement data of the traffic objects. This preferably relates to the movement data of other motor vehicles, of cyclists, of pedestrians and/or the like. As usual, these traffic objects can be particularly made available for driving the motor vehicle. In particular, the invention permits this by sensing a dynamic situation in relation to the driving of the motor vehicle and improving the transfer to the driver of the motor vehicle or to the module of the driver assistance system to which the driving of the motor vehicle is to be transferred in the public area.

There is preferably provision that an interpretation of a scene is made. In this context, the interpretation of the scene makes use of the fact that objects are identified on the basis of the additional data as well as, if appropriate, also further data, in particular relating to the sensing of the surrounding area, and in particular their position and, if appropriate, their movement. Furthermore, the objects can be further represented geometrically in a virtual spatial representation of the surrounding area. The objects can be classified within the scope of the interpretation of the scene, and a virtual overall representation of the surrounding area can be generated. In particular, an interpretation of a traffic situation as an interpretation of a scene which is relevant in particular for the current driving of the motor vehicle can then be made in particular using the virtual spatial representation. The interpretation of the scene permits additional information or data which may be additionally relevant for the transfer in relation to the driving of the motor vehicle to be acquired from the additional data. The interpretation of the scene can be made by means of a suitable scene interpretation unit, which may be included, for example, in the driver assistance system. However, it can also be available as a separate unit and does not need to be arranged in the motor vehicle but instead can basically also be provided motor-vehicle-externally via a suitable communication link. For the interpretation of the scene, the driver assistance system would then access the corresponding scene interpretation unit motor-vehicle-externally via the communication link.

However, the additional data can also comprise at least one input by the driver of the motor vehicle. Therefore, there may be provision, for example, that the driver of the motor vehicle makes a destination input on a navigation system, which is then taken into account in the further driving of the motor vehicle. There can, for example, also be provision that transfer of the driving of the motor vehicle to the driver of the motor vehicle is displayed as a selectable option and the driver reacts by making a corresponding input on this display. The input is then evaluated and a corresponding transfer functionality is executed.

In addition there is provision that a wireless communication link to at least one other motor vehicle is set up in a predefined surrounding area of the motor vehicle, and surroundings data of this further motor vehicle is transferred to the motor vehicle. For this purpose, for example a communication of the type of Car2Car, C2C, V2V, vehicle-to-infrastructure and/or the like can be used. The predefined surrounding area is, in particular, an area which surrounds an adjacent around the motor vehicle and in which the motor vehicle is driven or is to be driven. The surrounding area is preferably defined in such a way that fault-free driving of the motor vehicle can be ensured in the satisfactory driving mode. The communication link can be produced to at least one further motor vehicle which is arranged inside the surrounding area, in order to receive at least some of the surrounding data which is available in the further motor vehicle. This data can then be used for the functionality according to the invention. The communication link is embodied in a wireless fashion and can be, for example, a radio link based on a suitable radio standard or the like. For example, the radio link can be a near-field link using a communication protocol such as WLAN, Bluetooth, ZigBee or the like. The radio link can, however, also be a mobile radio link using a mobile radio standard such as UMTS, LTE or the like.

Furthermore, it is proposed that depending on the interpretation of the scene, an input by the driver is taken into account in the continuation of the movement of the motor vehicle along the trajectory. This can consist, for example, in the input by the driver being taken into account only when the corresponding continuation of the movement of the motor vehicle is possible depending on the interpretation of the scene. Therefore, there can be provision, for example, that an input by the driver relating to the continuation of the movement of the motor vehicle is not taken into account if, for example, another traffic object could be affected. This proves particularly advantageous if the motor vehicle is driven on a parkland on which there are not only other motor vehicles but also pedestrians and cyclists. Overall, the functionality of the method according to the invention can thus be further improved.

The driver assistance system according to the invention can be arranged as separate assemblies in the motor vehicle. However, said system can also be provided integrated into a vehicle control system. There is therefore the possibility of also integrating the driver assistance system according to the invention at least partially into the vehicle control system of the motor vehicle or the like. There is, of course, also basically the possibility of at least partially providing the driver assistance system according to the invention externally to the motor vehicle and coupling it to the vehicle control system via a wireless communication link.

Further features of the invention emerge from the claims, the figures and the description of the figures. The features and combinations of features that are cited in the description above and also the features and combinations of features that are cited in the description of the figures below and/or shown in the figures alone can be used not only in the respectively indicated combination but also in other combinations without departing from the scope of the invention. Embodiments of the invention that are not explicitly shown and explained in the figures, but emerge and are producible from the explained embodiments by virtue of separate combinations of features, are therefore also intended to be regarded as included and as disclosed. Embodiments and combinations of features that therefore do not have all the features of an independent claim as originally worded are also intended to be regarded as disclosed. Furthermore, embodiments and combinations of features that go beyond or differ from the combinations of features set out in the back-references of the claims should be considered to be disclosed, in particular by the embodiments set out above.

In the figures:

FIG. 6 shows a schematic illustration like FIG. 5, wherein according to a second alternative surroundings data is acquired.

Figure 1:
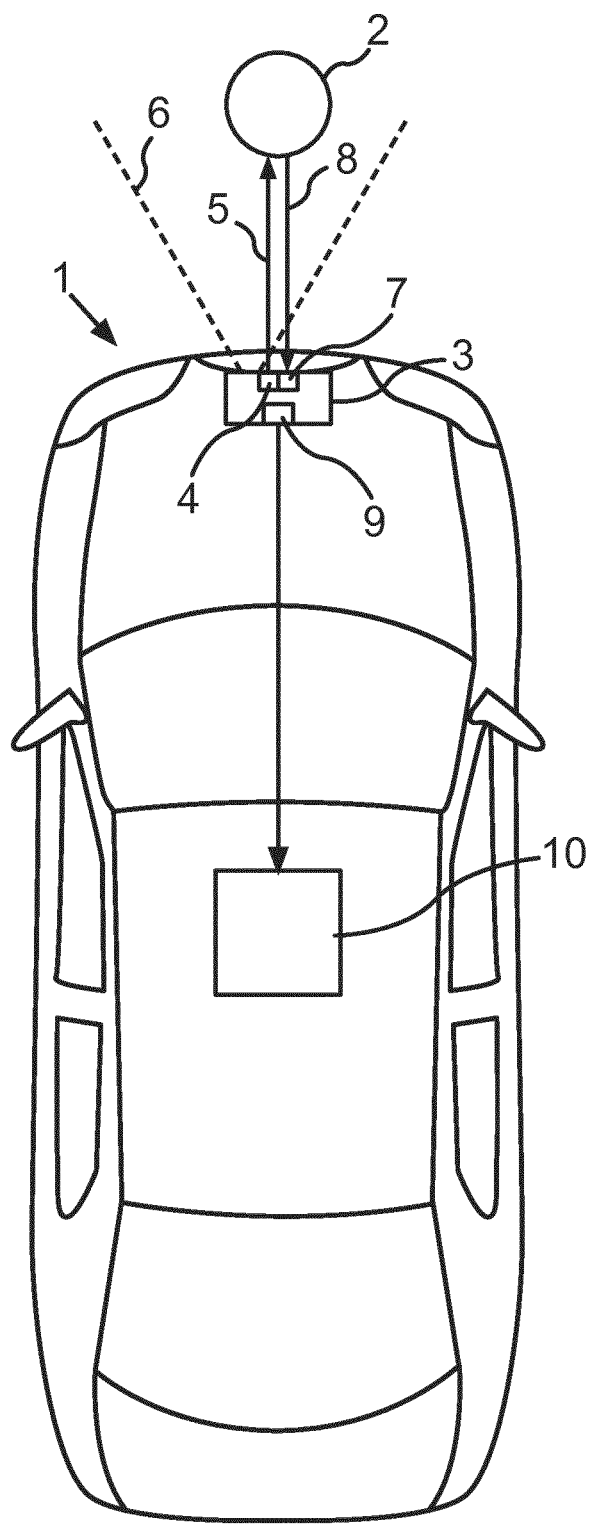
FIG. 1 shows a schematic illustration of a motor vehicle with a driver assistance system.

FIG. 1 shows a schematic plan view of a motor vehicle 1 according to an embodiment of the invention. In the present case, the motor vehicle 1 is embodied as a passenger motor vehicle. The motor vehicle 1 comprises an electronic control device which comprises a driver assistance system 10. For example an object, such as, for example, the object 2, which is located in an area surrounding the motor vehicle 1 can be sensed by the driver assistance system 10. If the object 2 is sensed, a warning can be output to a driver of the motor vehicle 1 by means of the driver assistance system 10. Furthermore, the driver assistance system 10 can also be used to intervene in a steering system, a brake system and/or a drive assembly of the motor vehicle 1, in order, for example, to avoid a collision with the object 2. However, this is not illustrated in FIG. 1 and the other figures.

In order to sense the object 2, the driver assistance system 10 has here an ultrasonic sensor 3 as a distance sensor. The ultrasonic sensor 3 comprises a transmitter device 4 by means of which ultrasonic signals can be emitted as a transmission signal 5. This is illustrated here by an arrow in FIG. 1. The transmitter device 4 can be used to emit the transmission signal 5 in a predetermined angular range 6. For example, the transmission signal 5 can be emitted in the predetermined horizontal angular range.

The ultrasonic sensor 3 also comprises a receiver device 7 by means of which the ultrasonic signals reflected by the object 2 can be received again as a reception signal 8. This is illustrated in FIG. 1 by a further arrow.

Furthermore, the ultrasonic sensor 3 comprises a program-controlled computer device 9 which can be formed, for example, by a microcontroller, digital signal processor, an integrated switching unit or the like. The computer device 9 can be used to actuate the transmitter device 4 to emit the transmission signal 5. Furthermore, the computer device 9 can evaluate signals of the receiver device 7 which are generated with the receiver device 7 on the basis of the received reception signal 8. Finally, an electronic control device, which comprises the driver assistance system 10, can be used to ensure that corresponding control signals can be output depending on the object 2 which is sensed with the ultrasonic sensor 3.

The ultrasonic sensor 3 is provided here only by way of example for a multiplicity of corresponding surroundings sensors (not illustrated in FIG. 1 here) of the motor vehicle 1, by means of with surroundings data relating to the motor vehicle 1 is made available. The surroundings sensors have an at least indirect communication link to the driver assistance system. The surroundings sensors can comprise not only radar sensors but also Lidar sensors, infrared sensors and/or the like.

The following FIGS. 2 to 6, with which the detailed invention is also explained further, relate to applications in which the driving of the motor vehicle 1 is transferred to the driver or to a suitable module of the driver assistance system.

Figure 2:
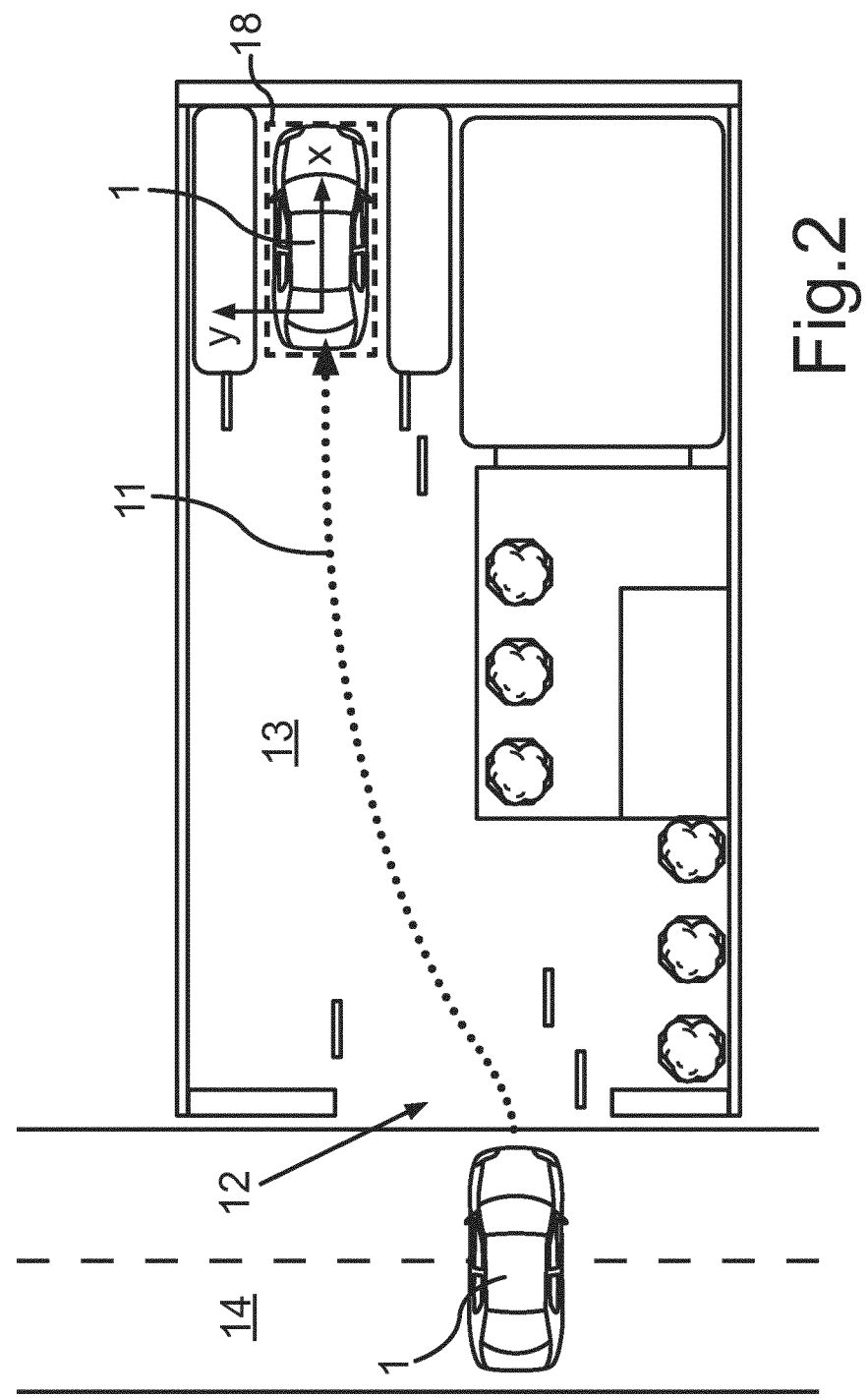
FIG. 2 shows a schematic illustration relating to the learning of a trajectory for automated parking of the motor vehicle according to FIG. 1, wherein a speed of the motor vehicle is reduced in the vicinity of the transition from the private area into the public area.

FIG. 2 shows a schematic illustration of the motor vehicle 1 which is operated here in a learning mode in order to learn a trajectory 11 which serves for driving the motor vehicle 1 in an automated fashion along this trajectory 11 in an operating mode. The motor vehicle 1 starts the learning process in a public area 14, which is, for example, a public road. In a private area 13 adjoining the public area 14, there is a car park 18 in which the motor vehicle 1 is to be parked.

In the learning mode, the motor vehicle 1 is driven manually by a driver (not illustrated) of the motor vehicle 1 along the trajectory 11 until the car park 18 is reached and the motor vehicle 1 is parked there.

The disadvantage of this learning process is that during automated driving of the motor vehicle 1 along the trajectory 11 in the operating mode, the motor vehicle is generally driven automatically to the end of the finite trajectory 11, irrespective of whether this end, or in fact any part of the trajectory 11, is located in a private area 13 or in the public area 14. This is also illustrated on the basis of FIG. 3, wherein—as is also apparent from FIGS. 2 and 3—in the private area 13 there are other objects 19 and 20 which are sensed by the surroundings sensors of the motor vehicle 1. Taking into account the sensed objects 19 and 20, a trajectory 17 is determined on the basis of which the motor vehicle can be moved out of a parking space in an automated fashion.

In order to move out of a parking space, the motor vehicle 1 is then driven along the trajectory 17 derived from the trajectory 11. The start of the movement along the trajectory 17 is therefore at the car park 18. Since both the trajectory 11 and therefore also the trajectory 17 extend into the public area 14, during the automated driving the motor vehicle 1 would therefore also be driven into the public area 14, that is to say would also pass through a transition 12 between the private area 13 and the public area 14.

Figure 3:
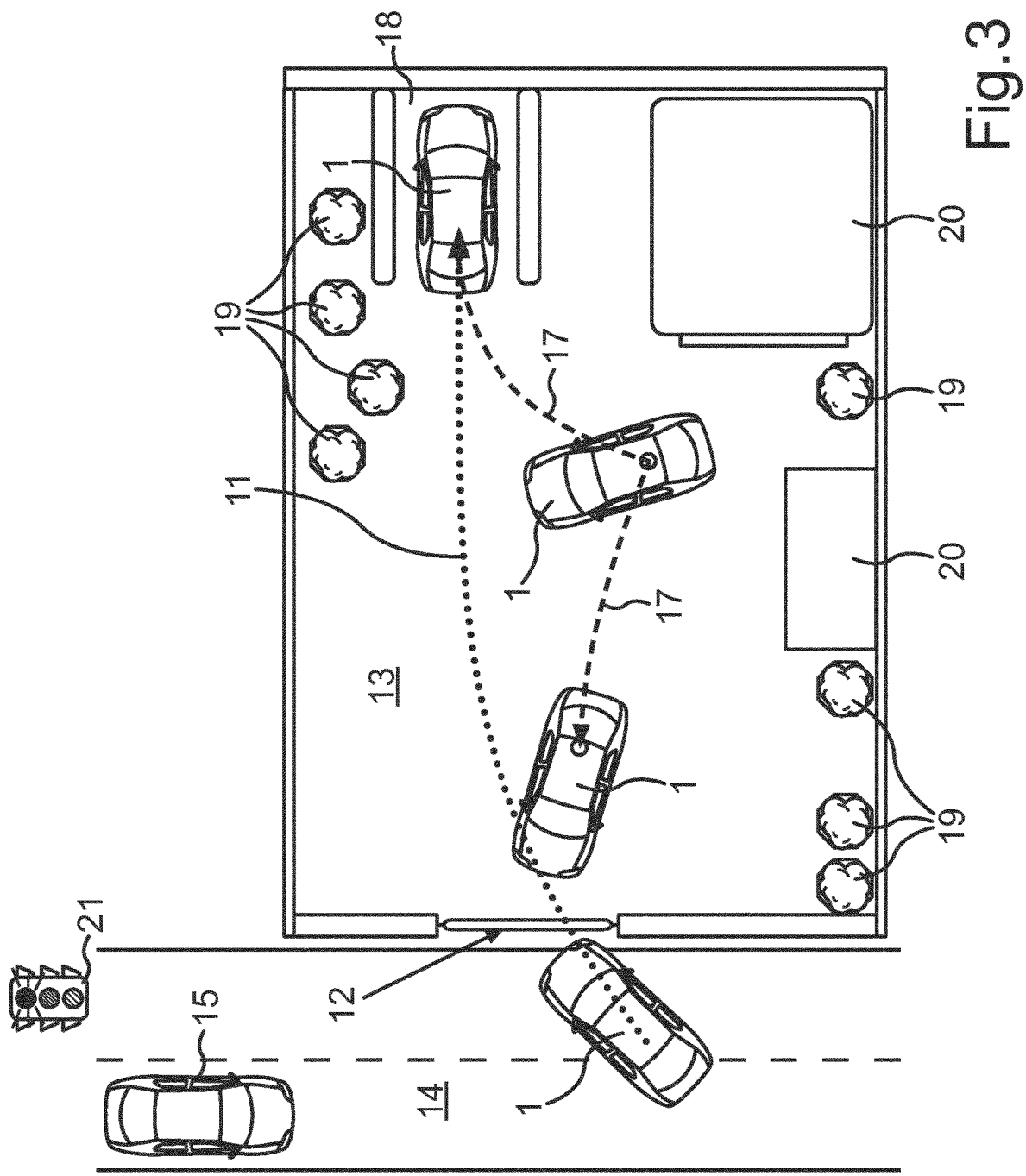
FIG. 3 shows a schematic illustration like FIG. 2, in which the motor vehicle is moved automatically out of the parked position.
Figure 4:
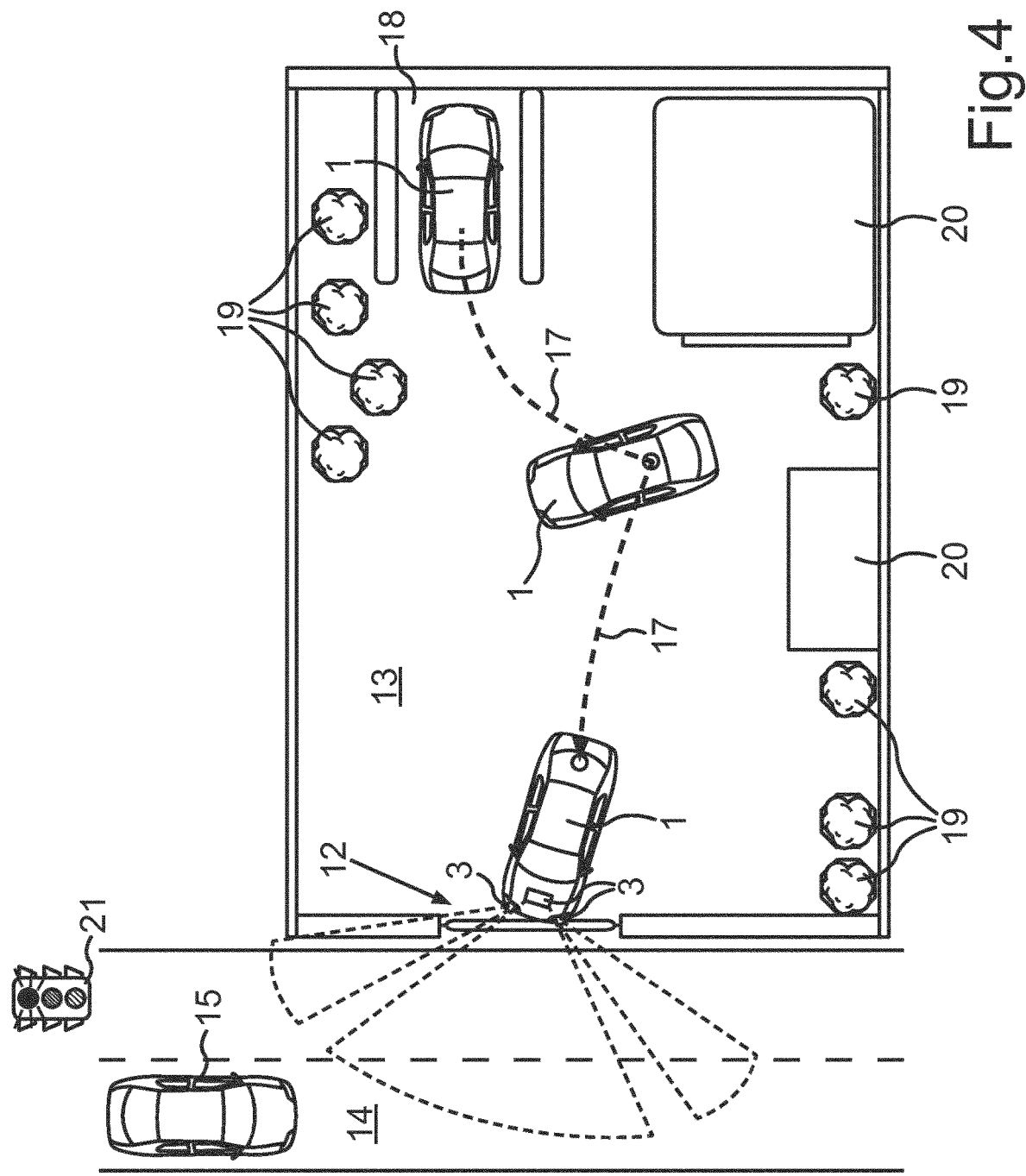
FIG. 4 shows a static illustration like FIG. 3, in which surroundings sensors are used to acquire additional data, specifically in particular for a transition from a private area to a public area, wherein surroundings sensors are additionally evaluated.

FIG. 4 shows a schematic illustration, like FIG. 3, of the movement out of a parking space of the motor vehicle 1 out of the car park 18. As is apparent from FIG. 4, when the transition 12 is reached there is provision that the motor vehicle 1 activates surroundings sensors 3, or at least currently evaluates in order to detect objects in the public area 14, here for example a motor vehicle 15 and a set of traffic lights 21. The corresponding data is made available to the driver assistance system 10 of the motor vehicle 1 as additional data.

The additional data preferably comprises essentially all the relevant traffic information or data of the public area 14 such as, for example, lane markings, lanes, traffic lights, the number of lanes per direction, road signs and/or the like. This information or data is used as an input in order to decide how a transition from the private area 13 can be carried out into the public area 14. In order to detect this traffic information, the surroundings sensors are provided. For example, a front-mounted camera, an all-round vision camera or a laser scanner can be mounted on the front and/or also on the rear of the motor vehicle 1, and, for example, corner radar sensors can also be used to be able to sense crossing traffic. These sensors can at least partially form the surroundings sensors.

By means of the surroundings sensors it is therefore possible to produce a surroundings map with detailed surroundings information or surroundings data, for example static objects, dynamic objects, classified traffic objects and/or the like. Furthermore, there can be provision that traffic information or traffic data from other road users, in particular other motor vehicles than the motor vehicle 15, can be determined. In addition, traffic data can also be acquired from infrastructure facilities such as the traffic lights 21. This additional data is available to the driver assistance system 10, as to which a corresponding transfer can be provided on the basis of transfer data generated therefrom.

In the configuration according to FIG. 3, there is additionally provision here that a speed of the motor vehicle 1 can be reduced in the vicinity of the transition 12 from the private area 13 to the public area 14. As a result, a time window can be provided in which a transfer of the driving of the motor vehicle 1 can take place so that stopping of the motor vehicle 1 at the transition 12 can be largely avoided.

At FIG. 4, dynamic objects can then be additionally detected and tracked, as is the case here, for example, with the motor vehicle 15. As a result, the additional data can be correspondingly added to so that a virtually automated transition of the driving of the motor vehicle 1 from the private area 13 to the public area 14 can be made possible.

Figure 5:
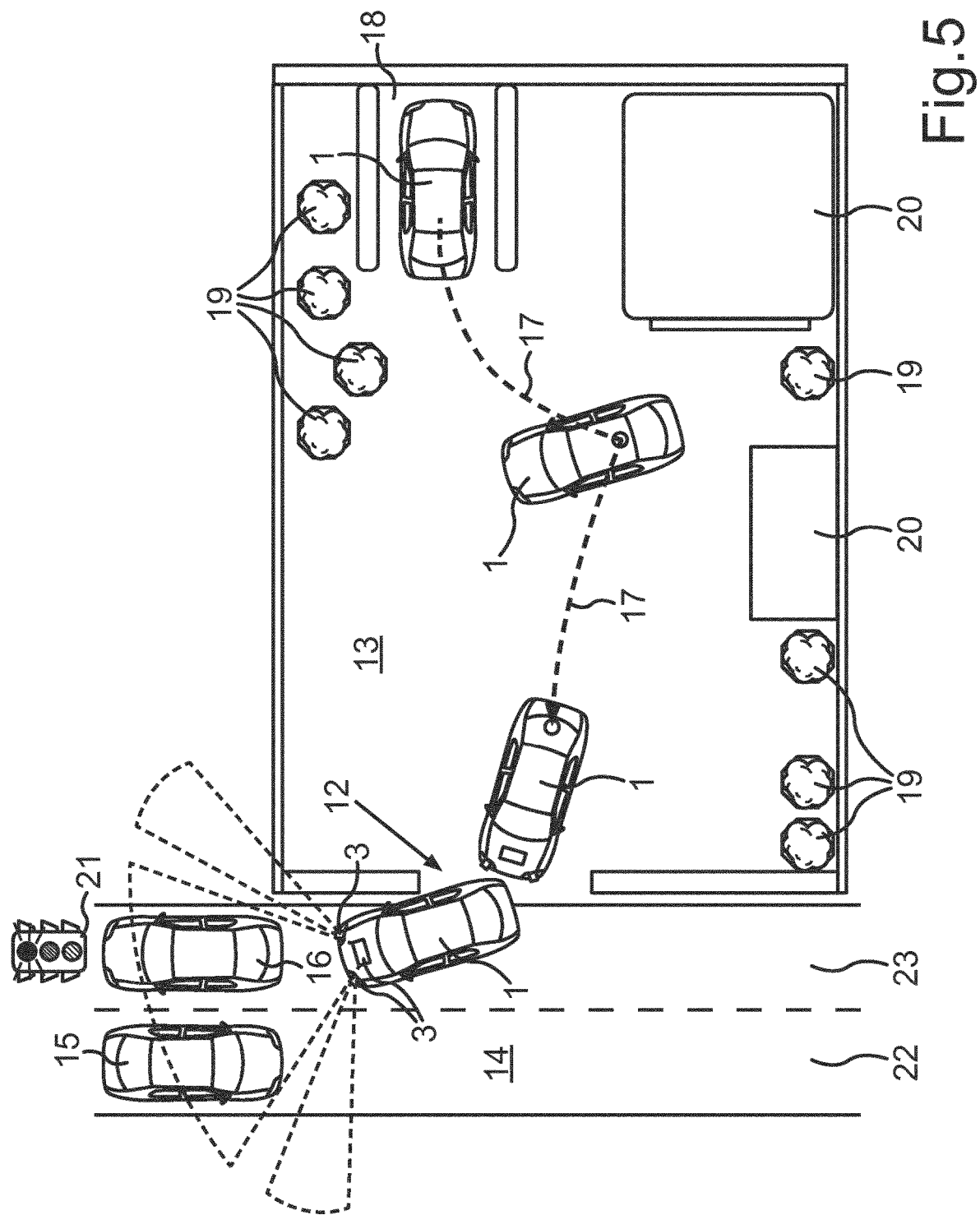
FIG. 5 shows a schematic illustration like FIG. 4 in which in a first alternative other road users are additionally sensed.

FIG. 5 shows a schematic illustration like FIG. 4 in which, however, a low-speed adaptive cruise control assistant of the driving assistant 10 is actuated in order to drive the motor vehicle 1 in the public area 14. Carriageways 22 and 23 of the public area 14 are detected by the surroundings sensors 3 for this purpose. Motor vehicles 15 and 16 driving on the carriageways 22 and 23 are detected as traffic objects and their movement tracked. Furthermore, in this refinement there is the possibility that the driver indicates, through an input, a direction in which the motor vehicle 1 makes a turn at the transition 12 onto the carriageway 23. There is provision here for a turn to be made in a right-hand direction. As soon as the transition 12 is passed through by the motor vehicle 1, the low-speed adaptive cruise control assistant is activated in the driver assistance system 10, and the determined additional data is made available in order to use the low-speed adaptive cruise control assistant.

FIG. 6 shows an alternative refinement to FIG. 5 in which the driver makes an input to make a left-hand turn. There is also provision here that the low-speed adaptive cruise control assistant takes over the driving of the motor vehicle 1 at the transition 12 from the private area 13 to the public area 14. By means of the surroundings sensors 3, the relevant surroundings of the motor vehicle 1 are sensed for objects, in particular traffic objects such as the motor vehicle 16. Since in the present situation according to FIG. 6 the carriageway 22 onto which the motor vehicle 1 must turn is free and also there is no crossing traffic present on the carriageway 23 because the motor vehicle 16 has already passed through the intersection point, the low-speed cruise control assistant can drive the motor vehicle 1 onto the carriageway 22 in an automated fashion.

The driving of the motor vehicle 1 can also be basically transferred to the driver, instead of to the low-speed cruise control assistant. In this context, the relevant information relating to the transfer of the driving of the motor vehicle 1 in the public area 14 can be displayed to the driver, said information indicating, for example, that there is no traffic impeding the vehicle from making a turn onto the corresponding one of the carriageways 22, 23 or the like.

The exemplary embodiments are exclusively to explain the invention and are not intended to limit it. Of course, the features of the exemplary elements can also be combined with one another in virtually any desired fashion, in order to be able to arrive at further refinements within the scope of the invention.

The invention claimed is:

1. A method for operating a driver assistance system for a motor vehicle driven at least partially automated, comprising:
   learning a trajectory for driving the motor vehicle in a first automated manner along the trajectory in a learning mode;
   driving the motor vehicle in the first automated manner along the learnt trajectory in an operating mode following the learning mode;
   detecting at least one transition from a private area to a public area while the motor vehicle is being driven along the trajectory in the operating mode;
   acquiring additional data relating to the driving of the motor vehicle along the trajectory in the public area, wherein the additional data comprise at least current traffic data relating to the driving of the motor vehicle in the public area adjoining the private area;
   providing the additional data for the driver assistance system; and
   driving the motor vehicle along the learnt trajectory in a second automated manner in the public area using the additional data.

2. The method according to claim 1, wherein the additional data is provided for a driver assistant of the driver assistance system or a driver of the motor vehicle.

3. The method according to claim 1, wherein the additional data is acquired before the transition from the private area to the public area is reached.

4. The method according to claim 1, wherein a distance of a current position of the motor vehicle from the transition from the private area to the public area is detected and compared with a predefined comparison value, and in which the acquisition of the additional data is started in an automated fashion when the distance is smaller than the comparison value.

5. The method according to claim 4, wherein a speed of the motor vehicle is set as a function of the distance.

6. The method according to claim 1, wherein the additional data is acquired and stored at least partially while the trajectory is being learnt.

7. The method according to claim 1, wherein the additional data comprises traffic objects in the public area.

8. The method according to claim 7, wherein the additional data at least partially comprises movement data of the traffic objects.

9. The method according to claim 1, wherein an interpretation of a scene is made.

10. The method according to claim 1, wherein the additional data comprises at least one input by the driver of the motor vehicle.

11. The method according to claim 9, wherein, depending on the interpretation of the scene, an input by the driver is taken into account in the continuation of the movement of the motor vehicle along the trajectory.

12. The method according to claim 1, wherein a wireless communication link to at least one other motor vehicle is set up in a predefined surrounding area of the motor vehicle, and surroundings data of this further motor vehicle is transferred to the motor vehicle.

13. A computer program product with program code means which are stored in a non-transitory computer readable medium, in order to carry out the method for operating the driver assistance system according to claim 1, when the computer program product is run on a computer unit of an electronic control unit.

14. A driver assistance system for driving a motor vehicle in an at least partially automated manner, wherein the driver assistance system is configured:
   to learn a trajectory for driving the motor vehicle in a first automated fashion along the trajectory in a learning mode;
   to drive the motor vehicle in the first automated fashion along the learnt trajectory, in an operating mode following the learning mode,
   to detect at least one transition from a private area to a public area while the motor vehicle is being driven along the trajectory in the operating mode,
   to acquire additional data relating to the driving of the motor vehicle along the trajectory in the public area, wherein the additional data comprises at least current traffic data relating to the driving of the motor vehicle in the public area adjoining the private area, to use the additional data to drive the motor vehicle along the learnt trajectory in a second automated fashion in the public area.

15. The method according to claim 1, wherein driving the vehicle in the second automated manner comprises accelerating the vehicle, braking the vehicle, activating and deactivating a parking assistant of the vehicle, and activating signaling devices of the vehicle.

* * * * *